United States Patent [19]
Matsunaga

[11] Patent Number: 5,582,663
[45] Date of Patent: Dec. 10, 1996

[54] INFRARED ADHESIVE BEAD DETECTOR

[75] Inventor: Masafumi Matsunaga, Yokohama, Japan

[73] Assignee: Nordson Corporation, Westlake, Ohio

[21] Appl. No.: 297,977

[22] Filed: Aug. 30, 1994

[30] Foreign Application Priority Data

Sep. 7, 1993 [JP] Japan ................... 5-246314

[51] Int. Cl.$^6$ ................................. B32B 31/00
[52] U.S. Cl. ................ 156/64; 156/351; 156/356; 156/357; 118/688
[58] Field of Search ............... 156/64, 351, 356, 156/357; 118/679, 688, 712, 690, 691

[56] References Cited

U.S. PATENT DOCUMENTS

| | | |
|---|---|---|
| 3,067,646 | 12/1962 | Reesen . |
| 3,380,431 | 4/1968 | Keyes . |
| 4,251,566 | 2/1981 | Gingerich ................... 427/10 |
| 4,256,526 | 3/1981 | McDaniel ................ 156/356 X |
| 4,330,354 | 5/1982 | Deubner et al. ............ 156/352 |
| 4,343,182 | 8/1982 | Pompei ........................ 374/31 |
| 4,389,969 | 6/1983 | Johnson ....................... 118/665 |
| 4,498,415 | 2/1985 | Tsuchiya et al. ............ 118/712 |
| 4,566,808 | 1/1986 | Pompei et al. . |
| 4,636,091 | 1/1987 | Pompei et al. ............ 374/124 |
| 4,762,578 | 8/1988 | Burgin, Jr. et al. .......... 156/64 |
| 4,795,510 | 1/1989 | Wittrock et al. ............ 156/64 |
| 4,831,258 | 5/1989 | Pauck et al. ................ 250/349 |
| 4,935,261 | 6/1990 | Srivastava et al. . |
| 4,978,872 | 12/1990 | Morse et al. ............... 307/490 |
| 5,026,989 | 6/1991 | Merkel . |
| 5,188,695 | 2/1993 | Colton ........................ 156/356 |
| 5,208,064 | 5/1993 | Becker et al. ................ 427/8 |
| 5,322,706 | 6/1994 | Merkel et al. ................ 427/8 |

FOREIGN PATENT DOCUMENTS

| | | |
|---|---|---|
| 9110924 | 7/1991 | Germany . |
| 54-119282 | 3/1979 | Japan . |
| 1277724 | 10/1989 | Japan . |
| 4-51415 | 8/1992 | Japan . |

OTHER PUBLICATIONS

ELTEC Instruments, Inc. 815/815B IR-EYE™ Sensing/Monitor (Publication) 1984 (11 pp.).
Microscanner Monitor, Exergen Corporation, 1984 (14 pp.).

*Primary Examiner*—David A. Simmons
*Assistant Examiner*—Paul M. Rivard
*Attorney, Agent, or Firm*—Raymond J. Slattery, III

[57] ABSTRACT

A system for detecting the presence of an object, it shape, length, size, etc., and if a heating material such as a hot melt adhesive applied to the object is applied to given places, or in the proper amount is accomplished by an infrared detection system which is not influenced by external disturbances. A radiant energy detection sensor is placed opposite a radiant energy source, and an object is moved between the radiant energy source and radiant energy detection sensor.

9 Claims, 2 Drawing Sheets

INFRARED ADHESIVE BEAD DETECTOR

BACKGROUND OF THE INVENTION

The invention pertains to a sensor and a method for detecting an object or a thermal energy radiating substance provided partly on an object. In particular, this invention relates to the detection or monitoring of material dispensed onto a substrate, such as infrared monitoring of beads of adhesive material, such as but not limited to, the monitoring of beads of hot melt adhesive deposited on cartons or the like.

Methods for detecting the presence of an object and the length of the object, by moving the object or a sensor, have been carried out by using various sensors. For example, a limit switch-type sensor, a photoelectric sensor, an ultrasonic sensor, a color difference distinguishing sensor, and a proximity sensor have been used. These sensors have both advantages and disadvantages with regard to their use, performance, and cost features. In the field of applying a hot melt adhesive to a packaging material, attempts have been made to detect a heated material, such as a hot melt adhesive applied to an object, by providing two separate sensors for detecting the object and for detecting the heated material; such as an infrared sensor used as the sensor for detecting the heating material.

Up to now, the main problem with various sensors is their susceptibility to the effect of external disturbances. For example, noise or indirect energy from the surroundings that is close to the detection level of the sensor, often leads to erroneous detection. Furthermore, there is also a flaw in the response speed. For example, the response speed is limited to several tens of milliseconds in switch-type sensors and in proximity sensors, and a response speed of several milliseconds is the limit in a photoelectric sensor.

In order to detect whether or not the hot melt adhesive has been applied to a given location on the packaging material, one method that has been tried combines the signal from a sensor for detecting the packaging material and the signal from a sensor for detecting the hot melt, but this method requires two sensors, i.e., a sensor for detecting the packaging material and a sensor for detecting the hot melt.

SUMMARY OF THE INVENTION

The invention was developed in view of the above-mentioned problems, and its objective is to provide a detection method which can detect the presence of an object, its shape, length, and size, and whether or not a heating material such as a hot melt adhesive has been applied to a given location on the object. The detection method according to the invention has a fast response time, is very accurate, uses only one sensor, and is not affected by external disturbances.

To solve the aforesaid problems, the following detection method was developed in accordance with the present invention. In other words, a method was realized which relatively moves a radiant energy source, a radiant energy detection sensor placed opposite said radiant energy source, and an object between said radiant energy source and radiant energy detection sensor and detects the object by means of said radiant energy detection sensor.

Furthermore, a detection method was realized, such that the radiant energy source is a heat source and radiates infrared rays of an energy level that is higher than those of the object, and the radiant energy detection sensor is an infrared-detecting sensor in the aforesaid detection method.

Furthermore, a detection method was realized, such that a thermal energy radiating substance is provided in part on the object and the thermal energy radiating substance provided in part on the object, as well as the object, are detected by the radiant energy detection sensor in the aforesaid detection method.

Furthermore, a detection method was realized, such that the packaging material and the thermal energy radiating substance to object is be applied to said packaging material is a hot melt adhesive material in the aforesaid detection method.

Yet further, a detection method was realized, which is arranged in such a way that the radiant energy source is a dispensing gun or module for dispensing hot melt adhesive, which is provided opposite the radiant energy detection sensor.

With the detection method of the invention designed as mentioned above, the radiant energy detection sensor detects in normal occasions the level of energy that is generated from the radiant energy source and outputs a detected signal that corresponds to radiant energy. If an object with an energy level that differs from that of the radiant energy source exists between the radiant energy source and the radiant energy detection sensor, the energy level that is generated by the radiant energy source is obstructed by the object and thus the radiant energy detection sensor detects the energy from the object and outputs a detected signal that corresponds to that energy, to a control system. In this way, the presence of an object, and its shape, length, and size can be detected accurately at a first response speed, without being influenced by external disturbance such as noise from the surroundings.

Furthermore, by using a radiant energy source which is a heat source and radiates infrared rays of an energy level higher than those of the object and by using an infrared sensor as the radiant energy detection sensor, the energy level from the radiant energy source, the energy level from a packaging material or the like, and the energy level from a hot melt adhesive can be detected accurately by one infrared sensor, when detecting whether the hot melt adhesive applied to a packaging material or the like has been applied to given places.

These and other objects, features and advantages may be accomplished by an adhesive dispensing system for dispensing adhesives onto objects moved by a conveying means, the system comprising: first and second dispensers, disposed on opposite sides of the conveying means, for dispensing a heated adhesive onto an object transported by the conveying means; a first sensor means for sensing radiant energy, disposed adjacent to the first dispenser and generating a signal correlated to the radiant energy of the second dispenser when the object is not disposed between the first sensor and the second dispenser and for generating a signal corresponding to the radiant energy of the adhesive dispensed on the object when the object is disposed therebetween; a second sensor means for sensing radiant energy, disposed adjacent to the second dispenser and generating a signal correlated to the radiant energy of the first dispenser when the object is not disposed between the second sensor and the first dispenser and for generating a signal corresponding to the radiant energy of the adhesives dispensed on the object when the object is disposed therebetween; wherein the first and second dispensers each generate more radiant energy than its associated environment; and a control means coupled to said first and second dispensers for receiving the generated signals, and for determining at least one of the following:

i) number of beads dispensed;

ii) length of the beads; and iii) if too much or too little adhesive has been dispensed onto the object.

Some of these and other objects, features and advantages, can be also accomplished by a method of dispensing adhesive comprising the steps of: causing a sensor to detect energy generated by an opposed radiant energy source and generating a signal correlated to the amount of energy detected, wherein the radiant energy source has a higher energy level than its surroundings; dispensing a heated adhesive onto an object; causing the object to be interposed between the sensor and the radiant energy source; and then comparing changes in the signal of the sensor to determine at least one of the following:

i) number of beads of adhesive dispensed;

ii) length of the beads; and iii) if too much or too little adhesive has been dispensed onto the object.

These and other objects, features and advantages can be still further accomplished by a method of dispensing heated adhesives comprising the steps of: providing first and second dispensers, spaced apart and disposed on opposite sides of a conveying means, each dispenser generating radiant energy; causing a first sensor means, disposed adjacent to the first dispenser, to detect radiant energy of the second dispenser; causing a second sensor means disposed adjacent to the second dispenser, to detect radiant energy of the first dispenser; causing the first and second sensor means to generate a signal correlated to the respective radiant energy detected such that ambient temperature changes are eliminated; causing said first and second dispensers to dispense heated adhesive onto an object and causing the object to prevent the first and second sensor means from detecting the radiant energy of the respective dispenser; causing the first and second sensor means to detect heated adhesive deposited on the object and generating a signal correlated to energy of the adhesive detected; and comparing the signal correlated to the energy of the adhesive detected to a reference to determine at least one of the following:

i) number of beads of adhesive dispensed;

ii) length of the beads; and iii) if too much or too little adhesive has been dispensed onto the object.

BRIEF DESCRIPTION OF DRAWINGS

The following is a brief description of the drawings in which like parts bear like reference numerals and in which.

DETAILED DESCRIPTION OF THE INVENTION

Figure 1:
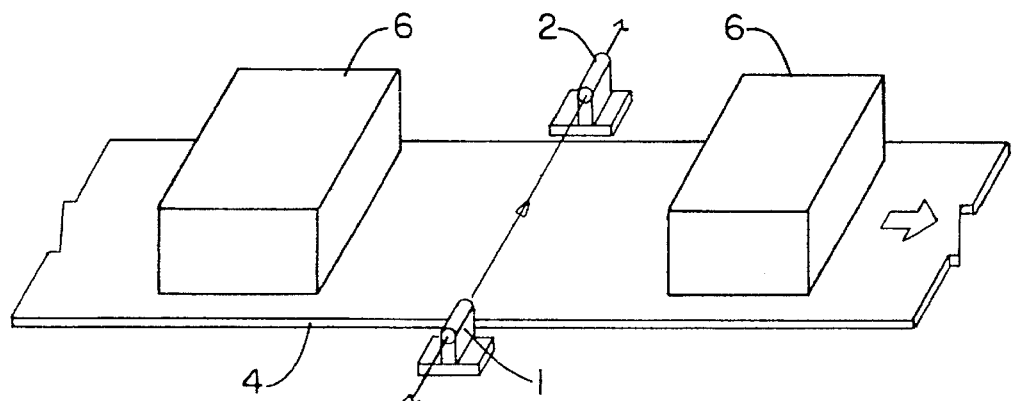
FIG. 1 is a perspective view of one embodiment of the invention.

The detection method according to the invention is described below with reference to drawings which indicate actual examples.

In the figures, a radiant energy detection sensor 1 is opposite a radiant energy source 2, and an object 6 which is moved by a moving belt conveyor 4 or the like, is moved in the direction of the arrow from left to right in the figures, between said radiant energy detection sensor 1 and radiant energy source 2. Here, it is desirable to construct the radiant energy source 2 with an element that is a heat source and radiates infrared rays of an energy level higher than those of object 6, and it is desirable to construct the radiant energy detection sensor 1 as an infrared sensor. Furthermore, it is desirable to use PbSe (lead selenide), or some other material having a high sensitivity, as the element of the infrared sensor.

Under normal conditions, the radiant energy detection sensor 1 outputs a signal corresponding to the energy level which is generated by the radiant energy source 2, i.e., when the object 6 does not exist in the space between the radiant energy sensor 1 and source 2. If the object 6 being conveyed by the moving conveyor belt 4 advances to a position between the radiant energy source 2 and the radiant energy detection sensor 1 and blocks the radiant energy from the radiant energy source 2, the radiant energy detection sensor 1 will output a radiant energy signal corresponding to the energy level radiated by the object 6.

By setting up an arrangement such that, in the normal state, the radiant energy detection sensor detects the high energy which is produced by the radiant energy source 2, when there is no large difference in the energy levels of the object and the environment in which the object is placed, the presence of object 6, and its shape, length, and size can be detected accurately without being influenced by external disturbances such as noise from the surroundings. Furthermore, the use of an infrared sensor as the radiant energy detection sensor 1 provides an extremely high response speed.

In this actual example, the radiant energy detection sensor 1 and the radiant energy source 2 are fixed and the object 6 is actually moved, but needless to say, the exact same effect can be achieved if the object 6 is fixed and the radiant energy detection sensor 1 and the radiant energy source 2 are arranged to be moved.

Figure 4:
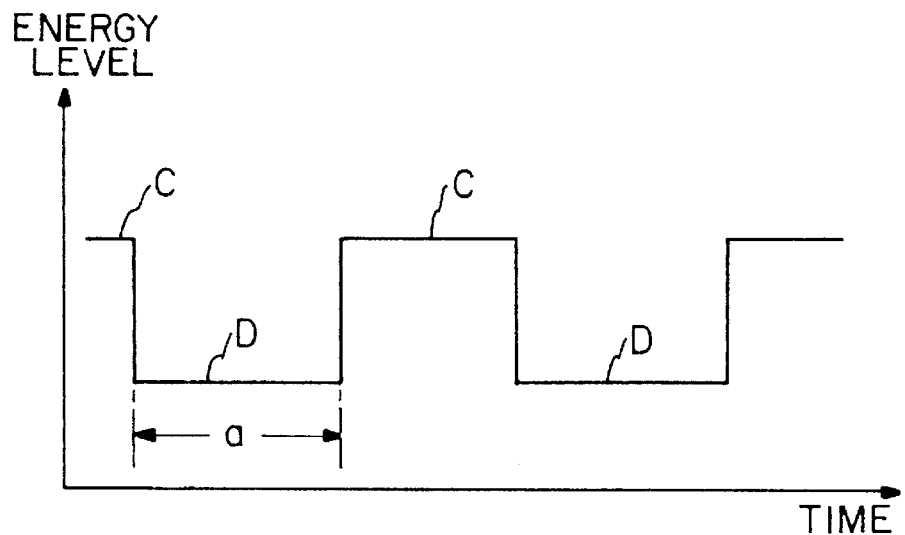
FIG. 4 is a waveform chart which indicates the energy level detected by the radiant energy detection sensor according to the first embodiment of the invention of FIG. 1.

FIG. 4 shows a waveform chart indicating the energy level detected by the radiant energy detection sensor 1 according to the first actual example. The figure shows time along the horizontal axis and the energy level along the vertical axis. The higher energy levels "c", correspond to the energy level of the radiant energy source 2 while the lower energy level "d" correspond to the energy level of the object 6. The time interval "a" is the length of time that the object 6 is between the source 2 and the sensor 1. From this interval "a", the length or some other parameter of object 6 can be determined. For example, if the speed of the conveyor 4 is known, the time interval "a" is known, the determination of the length of the object is straight forward.

Figure 2:
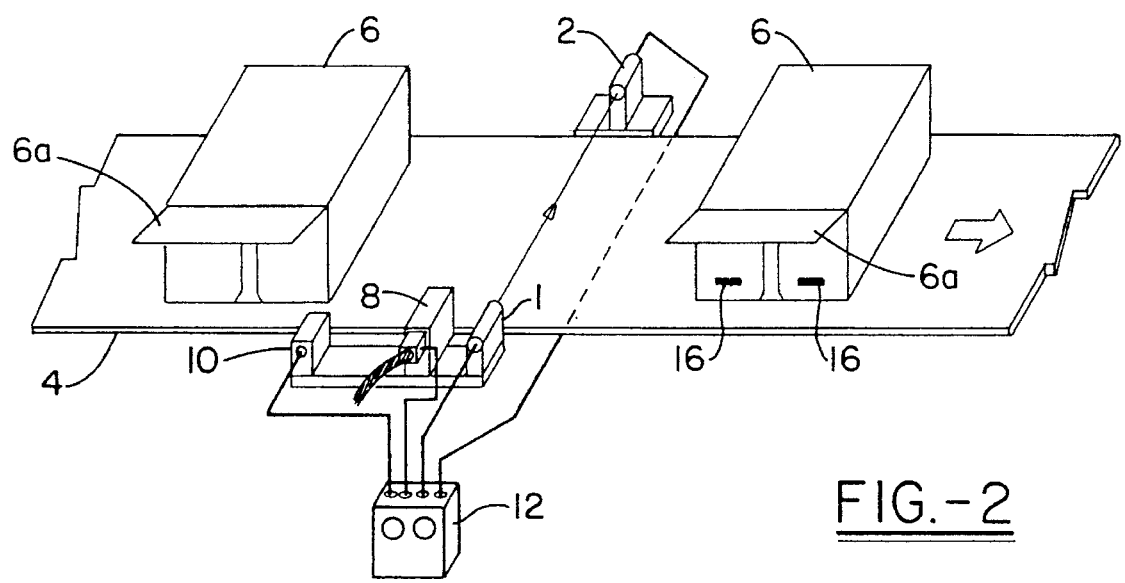
FIG. 2 is a perspective view of a second embodiment of the invention.

The second actual example of the invention shown in FIG. 2 is described below. Parts which perform the same function as in the first actual example are given the same symbols, and their detailed description is omitted. With reference to FIG. 2, the radiant energy detection sensor 1 is placed opposite a radiant energy source 2, and an object 6, which is moved by a moving belt conveyor 4 or the like, is moved in the direction of an arrow from left to right in FIG. 2, between the radiant energy detection sensor 1 and the radiant energy source 2. In this example, the object 6 is a cardboard box. A dispensing gun 8 is provided adjacent to the radiant energy detection sensor 1 and is used to apply a hot melt adhesive to the object 6, i.e., the cardboard box.

The dispensing gun 8 is used to intermittently apply a hot melt adhesive, which is pressure fed from a hot melt applicator not shown in the figure, on given places on the surface of cardboard box 6, based on the open and close signal from a microprocessor incorporated in an operating panel 12. Here, the hot melt adhesive is composed of a thermoplastic resin which is usually heated to about 150°–250° C. and applied in the molten state. Accordingly, the hot melt adhesive 16 emits a high level of thermal radiant energy.

A sensor 10, for detecting the cardboard box 6 being conveyed by a belt conveyor 4, generates a trigger signal for the dispensing gun 8 and is inputted into a microprocessor incorporated in operating panel 12, so as to apply the hot melt adhesive 16 to given places on cardboard box 6 by intermittently opening and closing the dispensing gun 8 according to a program that is established by taking account of the speed of belt conveyor 4, etc., when cardboard box 6 passes in front of where the adhesive is applied via dispensing gun 8.

Once the hot melt adhesive 16 has been applied to the surface of cardboard box 6, the cardboard box 6 is then transferred by the belt conveyor to the next process where flap 6a of cardboard box 6 is folded to, bonded with the hot melt adhesive 16 to thereby close or seal the end of the box 6 (not shown).

It is an extremely important aspect of the process to make sure that the hot melt adhesive 16 has been accurately applied to given places. This task is described with reference to the waveform chart of FIG. 5, which indicates the energy level detected by the radiant energy sensor 1 according to FIG. 2.

Figure 5:
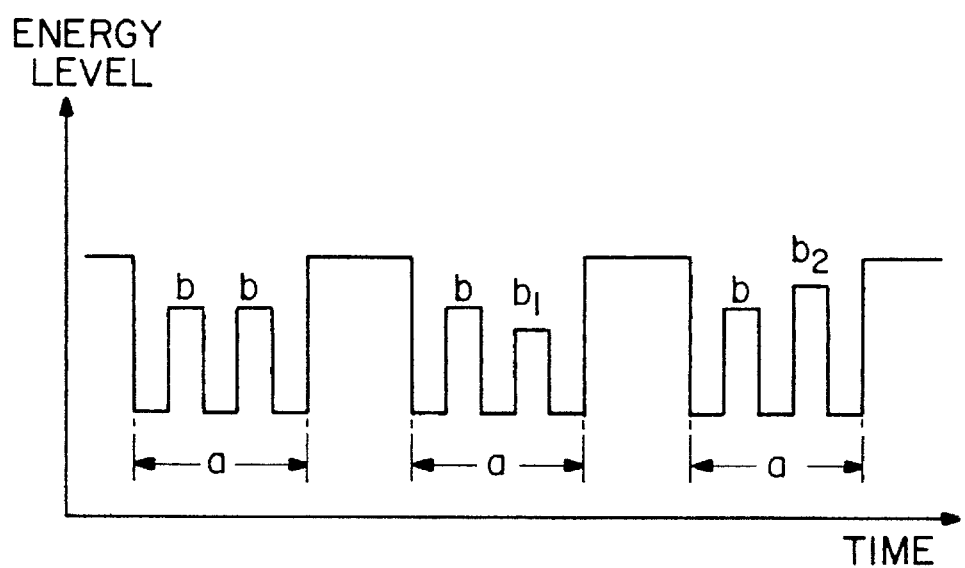
FIG. 5 is a waveform chart which indicates the energy level detected by the radiant energy detection sensor according to the second embodiment of the invention of FIG. 2.

FIG. 5 shows the time along the horizontal axis and the energy level along the vertical axis, and the portion "a" is the time during which the object 6, i.e., one cardboard box, passes in front of the radiant energy detection sensor 1. From this time "a", the length of object 6 can also be easily calculated. In this actual example, hot melt adhesive 16 is applied twice in the desired amount and length during the aforesaid time "a," hence it is shown that the thermal radiant energy level "b" of hot melt adhesive 16 is detected twice by the portion of each length, and it can be seen that the hot melt adhesive 16 is applied normally.

If the thermal radiant energy level "b" of the hot melt adhesive 16 appears only once or appears three times or more in the time "a" during which one cardboard box passes, or if a difference occurs in each length and its difference exceeds a given value, the microprocessor incorporated in the operating panel 12 processes the signal as defective and immediately outputs an alarm signal.

Furthermore, if the difference between the thermal radiant energy level "b" of hot melt adhesive 16 and $b_1$ when the amount of hot melt adhesive applied is smaller than a given amount and the energy level does not reach a given value, or $b_2$ when the amount applied is larger than a given amount and the energy level exceeds a given value, the microprocessor incorporated in the operating panel 12 processes the signal as defective and immediately output an alarm signal.

Arithmetic processing of these normal and defective signals can be performed by carrying out automatic sampling (teaching) at the start of the operation and establishing standard ranges in advance, and can be used as quality assurance means that conform to individual situations. Also possible is to incorporate the microprocessor so as to control arithmetic processing of these signals from radiant energy detection sensor 1 into radiant energy detection sensor 1 to realize a one-piece structure.

Thus, one radiant energy detection sensor 1 is enough according to the present actual examples, to judge whether the hot melt adhesive is correctly applied or not in the presence of a cardboard box, whereas two sensors have been used in the past. In the second actual example, a trigger signal to discharge the hot melt adhesive from the spray gun is obtained by sensor 10, but instead if spray gun 8 and radiant energy detection sensor 1 are placed in close proximity, the detected energy signal of the object detected by radiant energy detection sensor 1, i.e., the cardboard box, can also be used as trigger signal for the spray gun.

Figure 3:
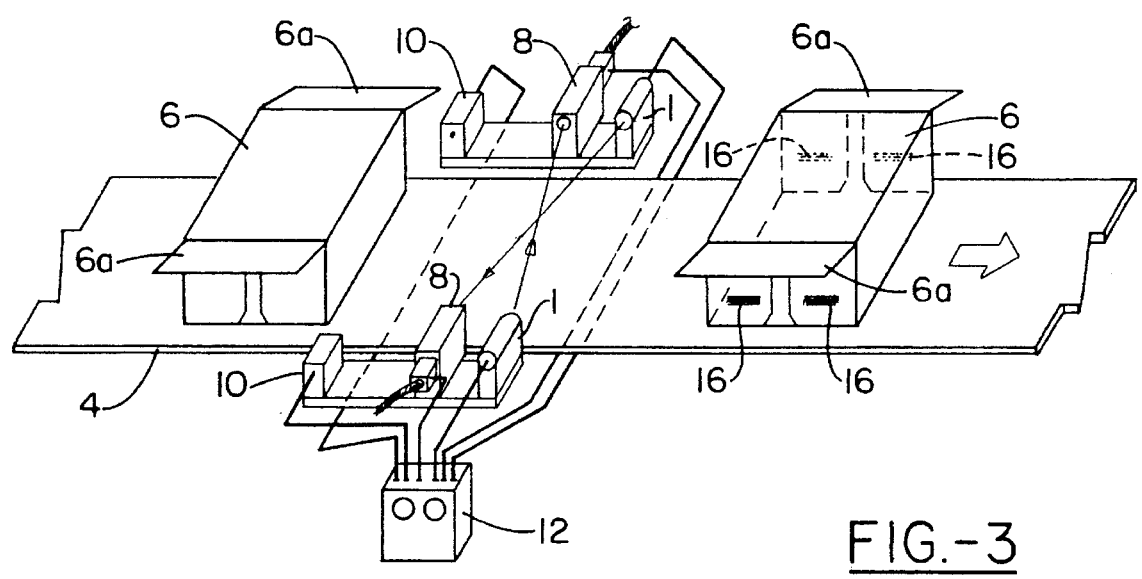
FIG. 3 is a perspective view of a third embodiment of the invention.

The third actual example of the invention shown in FIG. 3 is described below. The parts that perform the same function as in the first and second actual examples are given the same symbols, and their detailed description is omitted. This third actual example is very similar to the second actual example, and is designed so as to apply a hot melt adhesive simultaneously to both sides of a cardboard box which is packaging material and used as object 6.

In other words, radiant energy detection sensor 1, dispensing gun 8 for the hot melt adhesive, and sensor 10 are provided on both sides of cardboard box 6, so as to face each other. The radiant energy source 2 of FIG. 2 has been replaced by the dispensing gun 8 for the dispensing of hot melt adhesive. The dispensing guns 8 are used to apply the melted hot melt adhesive and so are maintained at a high temperature in accordance with that objective and thus radiates energy that is high enough to function in the same way as the radiant energy source. In other words, in this embodiment, each radiant energy detection sensor 1 is paired with an opposed dispensing gun 8 and as such, they function as the radiant energy sources. According to this actual example, whether the hot melt adhesive applied to both sides of a cardboard box is applied to the correct positions or not can be ascertained within the same process.

The second and third actual examples described above were explained with the process of applying a hot melt adhesive as an example, but the invention is not limited to the process of applying a hot melt adhesive and can be applied to any process such as the process of soldering packaging substrates, as long as there is a difference in radiant energy level between the object and the substance to be applied to the object. Setting the level in the normal state of the radiant energy detection sensor deliberately higher than that of the indoor environment, the object can be detected accurately and at a fast response speed with one sensor, without being influenced by external disturbances.

As described above, the method of the invention can detect sensing information such as the presence of an object, its shape, length, size, etc., and if a heating material, such as a hot melt adhesive applied to a object, is applied to given places, at a fast response speed and accurately with just one sensor, without being influenced by external disturbances.

These descriptions and details have been shown for the purpose of illustrating this invention and will become apparent to those skilled in the art that various changes and/or modifications may be made therein without departing from their original spirit and/or scope of the invention.

I claim:

1. An adhesive dispensing system for dispensing adhesives onto objects moved by a conveying means, the system comprising:

first and second dispensers, disposed on opposite sides of the conveying means, for dispensing a heated adhesive onto an object transported by the conveying means;

a first sensor means for sensing radiant energy, disposed adjacent to the first dispenser and generating a signal correlated to the radiant energy of the second dispenser when the object is not disposed between the first sensor and the second dispenser and for generating a signal corresponding to the radiant energy of the adhesive dispensed on the object when the object is disposed therebetween;

a second sensor means for sensing radiant energy, disposed adjacent to the second dispenser and generating a signal correlated to the radiant energy of the first dispenser when the object is not disposed between the second sensor and the first dispenser and for generating a signal corresponding to the radiant energy of the adhesives dispensed on the object when the object is disposed therebetween;

wherein the first and second dispensers each generate more radiant energy than its associated environment; and a control means coupled to said first and second sensors for receiving the generated signals, and for determining at least one of the following:

i) number of beads dispensed;

ii) length of the beads; and iii) if too much or too little adhesive has been dispensed onto the object.

2. An adhesive dispensing system according to claim 1 wherein the first and second sensor means are an infrared sensor.

3. An adhesive dispensing system according to claim 1 further comprising:

a means, responsive to changes in said signals of said sensor means for generating trigger signals, said trigger signals coupled to the dispensers for causing the dispensers to actuate.

4. The adhesive dispensing system of claim 3 wherein the first and second sensor means are an infrared sensor.

5. A method of dispensing adhesive comprising the steps of:

causing a sensor to detect energy generated by an opposed heated dispenser for dispensing a heated adhesive and generating a signal correlated to the amount of energy detected, wherein the heated dispenser has a higher energy level than its surroundings;

dispensing the heated adhesive onto an object;

causing the object to be interposed between the sensor and the heated dispenser; and then comparing changes in the signal of the sensor to determine at least one of the following:

i) number of beads of adhesive dispensed;

ii) length of the beads; and iii) if too much or too little adhesive has been dispensed onto the object.

6. The method of claim 5 further comprising the steps of:

generating a trigger signal in response to changes in said signal correlated to the amount of energy detected and causing the dispenser to dispense in response to said trigger signal.

7. A method of dispensing heated adhesives comprising the steps of:

providing first and second dispensers, spaced apart and disposed on opposite sides of a conveying means, each dispenser generating radiant energy;

causing a first sensor means, disposed adjacent to the first dispenser, to detect radiant energy of the second dispenser;

causing a second sensor means disposed adjacent to the second dispenser, to detect radiant energy of the first dispenser;

causing the first and second sensor means to generate a signal correlated to the respective radiant energy detected such that ambient temperature changes are eliminated;

causing said first and second dispensers to dispense heated adhesive onto an object and causing the object to prevent the first and second sensor means from detecting the radiant energy of the respective dispenser;

causing the first and second sensor means to detect heated adhesive deposited on the object and generating a signal correlated to energy of the adhesive detected; and comparing the signal correlated to the energy of the adhesive detected to a reference to determine at least one of the following:

i) number of beads of adhesive dispensed;

ii) length of the beads; and iii) if too much or too little adhesive has been dispensed onto the object.

8. The method of claim 7 wherein the sensor means is an infrared sensor.

9. The method of claim 7 further comprising the steps of:

generating a trigger signal in response to changes in the signal generated by the sensor means, and causing the dispensers to dispense in response to the trigger signals.

* * * * *